United States Patent Office.

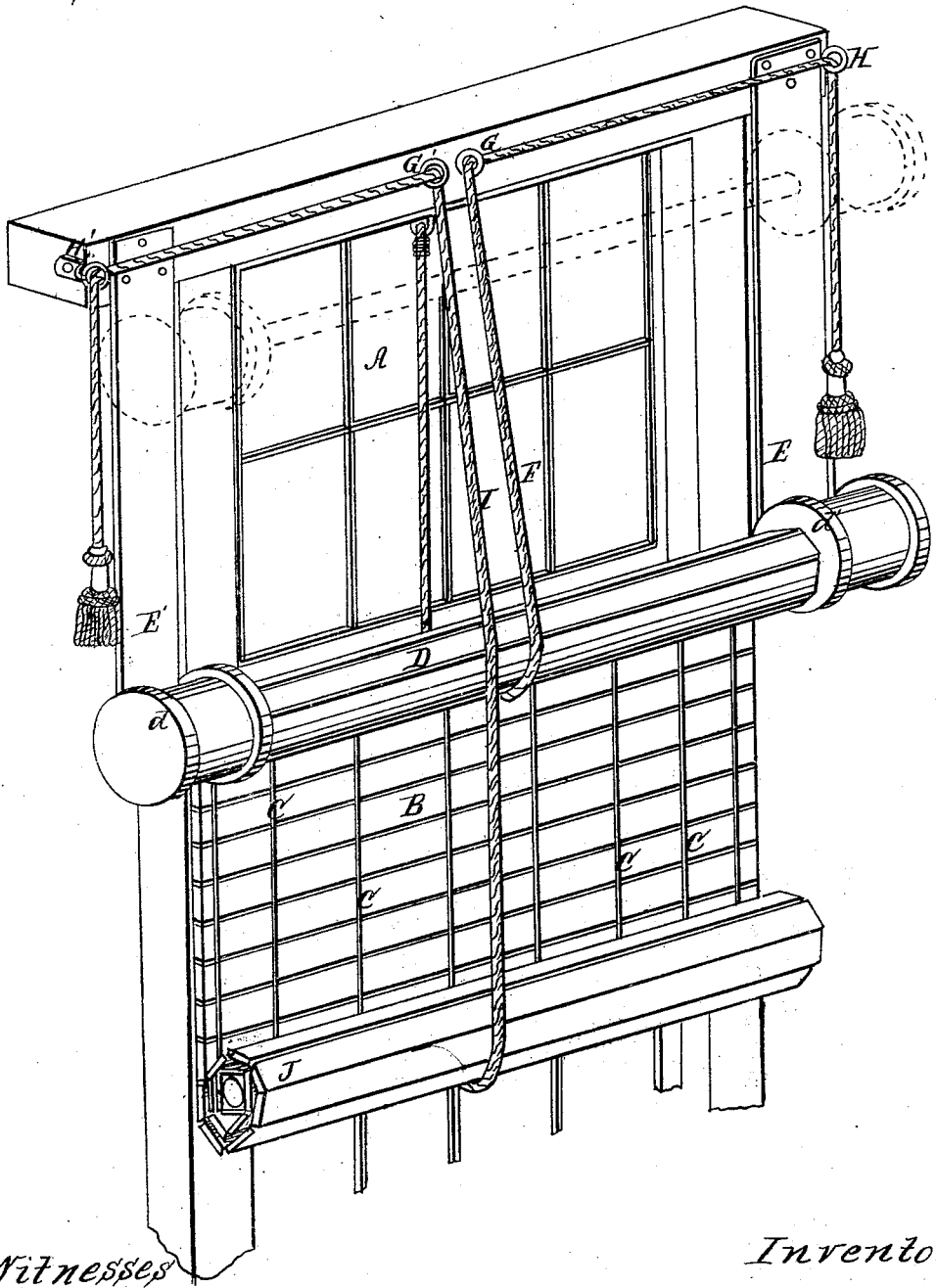

CHARLES G. MATCHETT, OF GREENVILLE, OHIO.

Letters Patent No. 62,765, dated March 12, 1867.

IMPROVED WINDOW BLIND.

*The Schedule referred to in these Letters Patent and making part of the same.*

TO WHOM IT MAY CONCERN:

Be it known that I, CHARLES G. MATCHETT, of Greenville, Darke county, Ohio, have invented a new and useful improvement in Window Blinds; and I hereby declare the following to be a full, clear, and exact description thereof, reference being had to the accompanying drawing, making part of this specification.

My invention relates to an arrangement whereby a blind may be rolled up from the bottom or let down from the top, or be rolled bodily upward or downward at discretion, so as to screen any desired part of the window, much or little, and either near the top or bottom, or any intermediate portion.

A represents the upper portion of a window. The blind proper may consist of a series of slats, B, connected together by cords, C, or of any suitable matted or woven fabric, and has its upper edge fastened to a roller, D, terminating in reels, $d$ $d'$, around which are wound bands, E E', suspended from the top of the window frame. A cord, F, attached to the roller D, and passing through suitable eyelets, G H, or over suitable sheaves, enables the upper roller to be rolled up or down at pleasure. A similar cord, I, attached to the lintel, and passing under and half around the lower roller J, and rove through eyelets G' H', enables the lower roller to be rolled up or down either in the same or opposite direction to the upper roller, so as to screen any desired portion whatever of the window whether in respect to extent or elevation.

All windows are, or should be, capable of being let down from the top as well as raised from the bottom, and window blinds or curtains that can only be raised from below upward must either be entirely elevated, and consequently put out of use, or else obstruct the upper and most valuable part of the ventilation. A blind thus elevated for the sake of air necessarily exposes the inmates to the public gaze, especially after nightfall, while, on the other hand, my form of blind enables the room to be perfectly screened without the least obstruction to ventilation. Hence my arrangement is deemed especially applicable to the windows of front rooms and of bedrooms generally, and to the halls of lodges and other places of assembly.

I claim herein as new, and of my invention—

A flexible curtain, B, provided with bands or cords, E E' F I, arranged substantially as set forth, to admit of rolling the curtain from the upper or lower end at will.

In testimony of which invention I hereunto set my hand.

CHAS. G. MATCHETT.

Witnesses:
GEO. H. KNIGHT,
W. H. MATCHETT.